United States Patent
Mangam et al.

(10) Patent No.: US 12,520,106 B2
(45) Date of Patent: Jan. 6, 2026

(54) SYSTEM AND METHOD FOR USE WITH ARTICLE OF PERSONAL PROTECTIVE EQUIPMENT

(71) Applicant: 3M INNOVATIVE PROPERTIES COMPANY, St. Paul, MN (US)

(72) Inventors: Abel Gladstone Mangam, Värnamo (SE); Frank T. Herfort, Korschenbroich (DE); Stefan M. Apelqvist, Vaggeryd (SE); Johan M. Svensson, Värnamo (SE)

(73) Assignee: 3M Innovative Properties Company, St. Paul, MN (US)

( * ) Notice: Subject to any disclaimer, the term of this patent is extended or adjusted under 35 U.S.C. 154(b) by 345 days.

(21) Appl. No.: 18/263,556

(22) PCT Filed: Jan. 21, 2022

(86) PCT No.: PCT/IB2022/050526
§ 371 (c)(1),
(2) Date: Jul. 31, 2023

(87) PCT Pub. No.: WO2022/162511
PCT Pub. Date: Aug. 4, 2022

(65) Prior Publication Data
US 2024/0121577 A1    Apr. 11, 2024

Related U.S. Application Data

(60) Provisional application No. 63/199,891, filed on Feb. 1, 2021.

(51) Int. Cl.
*H04W 4/00* (2018.01)
*H04L 9/32* (2006.01)
(Continued)

(52) U.S. Cl.
CPC .......... *H04W 4/029* (2018.02); *H04L 9/3247* (2013.01); *H04W 4/50* (2018.02); *H04W 4/60* (2018.02); *H04W 4/70* (2018.02); *H04W 12/069* (2021.01)

(58) Field of Classification Search
CPC ........ H04W 4/029; H04W 4/60; H04W 4/70; H04W 4/50; H04W 12/069; H04L 9/3247
See application file for complete search history.

(56) References Cited

U.S. PATENT DOCUMENTS

| 2014/0310772 A1 | 10/2014 | Marshall et al. |
| 2014/0365764 A1 | 12/2014 | Buer et al. |

(Continued)

FOREIGN PATENT DOCUMENTS

| WO | 2010033955 A1 | 3/2010 |
| WO | 2017155968 A1 | 9/2017 |

(Continued)

OTHER PUBLICATIONS

Azure IoT Hub (date unknown but believed to be prior to the date of the filing of the present application), URL <https://azure.microsoft.com/en-us/services/iot-hub/#features>, 5 Pages.

(Continued)

*Primary Examiner* — Erika A Washington
(74) *Attorney, Agent, or Firm* — Katherine M. Scholz; Jonathan V. Sry

(57) ABSTRACT

A system includes an article of personal protective equipment (PPE) including a functionality that is selectively configurable using a subscription service. The system further includes a first computing device including a first processor and a second computing device including a second processor. The first processor generates a subscription message including a request to enable the functionality of the article of PPE in response to determining a selection of the (Continued)

functionality. The second processor determines if credentials corresponding to the article of PPE and/or a user associated with the article of PPE are preregistered with the subscription service. The second processor determines a subscription status of the article of PPE corresponding to the functionality. The second processor transmits a configuration message based on the subscription status and preregistration with the subscription service. The first processor enables the functionality of the article of PPE based at least partly on the configuration message.

20 Claims, 7 Drawing Sheets

(51) Int. Cl.
*H04W 4/029* (2018.01)
*H04W 4/50* (2018.01)
*H04W 4/60* (2018.01)
*H04W 4/70* (2018.01)
*H04W 12/069* (2021.01)

(56) References Cited

U.S. PATENT DOCUMENTS

2020/0401675 A1 12/2020 Papa et al.
2022/0383730 A1* 12/2022 Swift ............... G06Q 10/06311
2025/0088558 A1* 3/2025 Farren ..................... H04W 4/90

FOREIGN PATENT DOCUMENTS

WO 2019051351 A1 3/2019
WO 2019220313 A1 11/2019

OTHER PUBLICATIONS

Honeywell, Noise Monitoring Headsets (date unknown but believed to be prior to the date of the filing of the present application), URL<https://safety.honeywell.com/en-us/products/by-category/hearing-protection/noise-monitoring-headsets>, 1 Page.
International Search report for PCT International Application No. PCT/IB2022/050526, mailed on Apr. 20, 2022, 5 pages.
Raspberry Pi Documentation (date unknown but believed to be prior to the date of the filing of the present application), URL <https://www.raspberrypi.org/documentation/configuration/config-txt/codeclicence.md>, 107 Pages.
Uvex, Digital personal protective equipment: uvex techware (date unknown but believed to be prior to the date of the filing of the present application), URL <https://www.uvex-safety.com/en/media/press-releases/2017/digital-personal-protective-equipment-uvex-techware/>, 4 Pages.

* cited by examiner

SYSTEM AND METHOD FOR USE WITH ARTICLE OF PERSONAL PROTECTIVE EQUIPMENT

CROSS REFERENCE TO RELATED APPLICATIONS

This application is a national stage filing under 35 U.S.C. 371 of PCT/IB2022/050526, filed Jan. 21, 2022, which claims the benefit of U.S. Provisional Application No. 63/199,891, filed Feb. 1, 2021, the disclosure of which is incorporated by reference in its/their entirety herein.

TECHNICAL FIELD

The present disclosure relates to a system and a method for use with an article of personal protective equipment.

BACKGROUND

Personal protective equipment (PPE) articles may be used by personnel working in hazardous or potentially hazardous environments. PPE articles may include hearing protection, such as headsets, that may be used by personnel operating in noisy environments. Some headsets may typically include wireless communication functionality that enables the headsets to communicate with each other, or with a network, or a remote server. The headsets may generally include some functionalities or features available from a manufacturer. However, in some cases, headsets may require additional functionalities that are not provided by the manufacturer. Such additional functionalities may not be readily accessible by a user. Further, such additional functionalities may be difficult to incorporate in existing headsets.

SUMMARY

In one aspect, a system is described. The system includes at least one article of personal protective equipment (PPE) including at least one functionality that is selectively configurable using a subscription service. The system further includes a first computing device communicatively coupled to the at least one article of PPE and including a first processor and a first memory. The system further includes a second computing device associated with the subscription service and communicatively coupled to the first computing device. The second computing device includes a second processor and a second memory. The first memory includes first instructions that, when executed by the first processor, cause the first processor to generate, in response to determining a selection of the at least one functionality that is configurable using the subscription service, a subscription message comprising a request to enable the at least one functionality of the at least one article of PPE. The second computing device is configured to receive the subscription message, and the second memory includes second instructions that, when executed by the second processor, in response to receiving the subscription message, cause the second processor to determine if credentials corresponding to at least one of the at least one article of PPE and a user associated with the at least one article of PPE are preregistered with the subscription service to enable the at least one functionality of the at least one article of PPE. The second processor is further configured to determine a subscription status of the at least one article of PPE corresponding to the at least one functionality from a subscription server communicatively coupled to the second computing device. The second processor is further configured to transmit, to the first computing device, a configuration message based on the subscription status and in response to determining that the credentials corresponding to the at least one of the at least one article of PPE and the user associated with the at least one article of PPE are preregistered with the subscription service to enable the at least one functionality of the at least one article of PPE. The configuration message includes configuration data to enable the at least one functionality of the at least one article of PPE. The first memory includes the first instructions that, when executed by the first processor, cause the first processor to, in response to receiving the configuration message, enable the at least one functionality of the at least one article of PPE based at least in part on the configuration data of the configuration message.

In another aspect, a method is described. The method includes generating, via a first computing device, a subscription message comprising a request to enable at least one functionality of at least one article of PPE in response to determining a selection of the at least one functionality that is selectively configurable using a subscription service. The method further includes receiving the subscription message at a second computing device associated with the subscription service and communicatively coupled to the first computing device. The method further includes determining, via the second computing device, if credentials corresponding to at least one of the at least one article of PPE and a user associated with the at least one article of PPE are preregistered with the subscription service to enable the at least one functionality of the at least one article of PPE. The method further includes determining, via a subscription server, a subscription status of the at least one article of PPE corresponding to the at least one functionality. The subscription server is communicatively coupled to the second computing device. The method further includes transmitting, via the second computing device, a configuration message to the first computing device based on the subscription status and in response to determining that the credentials corresponding to the at least one of the at least one article of PPE and the user associated with the at least one article of PPE are preregistered with the subscription service to enable the at least one functionality of the at least one article of PPE. The configuration message includes configuration data to enable the at least one functionality of the at least one article of PPE. The method further includes enabling, by the first computing device, the at least one functionality of the at least one article of PPE based at least in part on the configuration data of the configuration message.

In a further aspect, a system is described. The system includes at least one article of personal protective equipment (PPE) including at least one functionality that is selectively configurable using a subscription service. The system further includes a first computing device communicatively coupled to the at least one article of PPE and including a first processor and a first memory. The system further includes a second computing device associated with the subscription service and communicatively coupled to the first computing device. The second computing device includes a second processor and a second memory. The system further includes a location device communicatively coupled to the first processor and configured to generate a location signal based on a location of the at least one article of PPE. The first memory includes first instructions that, when executed by the first processor, cause the first processor to generate, in response to determining a selection of the at least one functionality that is configurable using the subscription service, a subscription message comprising a request to enable the at least one functionality of the at least one article of PPE. The second computing device is configured to receive the subscription message, and the second memory includes second instructions that, when executed by the second processor, in response to receiving the subscription message, cause the second processor to determine if credentials corresponding to at least one of the at least one article of PPE and a user associated with the at least one article of PPE are preregistered with the subscription service to enable the at least one functionality of the at least one article of PPE. The second processor is further configured to determine a subscription status of the at least one article of PPE corresponding to the at least one functionality from a subscription server communicatively coupled to the second computing device. The second processor is further configured to transmit, to the first computing device, a configuration message based on the subscription status and in response to determining that the credentials corresponding to the at least one of the at least one article of PPE and the user associated with the at least one article of PPE are preregistered with the subscription service to enable the at least one functionality of the at least one article of PPE. The configuration message includes configuration data to enable the at least one functionality of the at least one article of PPE. The first memory includes the first instructions that, when executed by the first processor, cause the first processor to, in response to receiving the configuration message, enable the at least one functionality of the at least one article of PPE based at least in part on the configuration data of the configuration message. The first processor is further configured to receive the location signal from the location device and at least partially restrict the at least one functionality based on the location signal of the at least one article of PPE.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
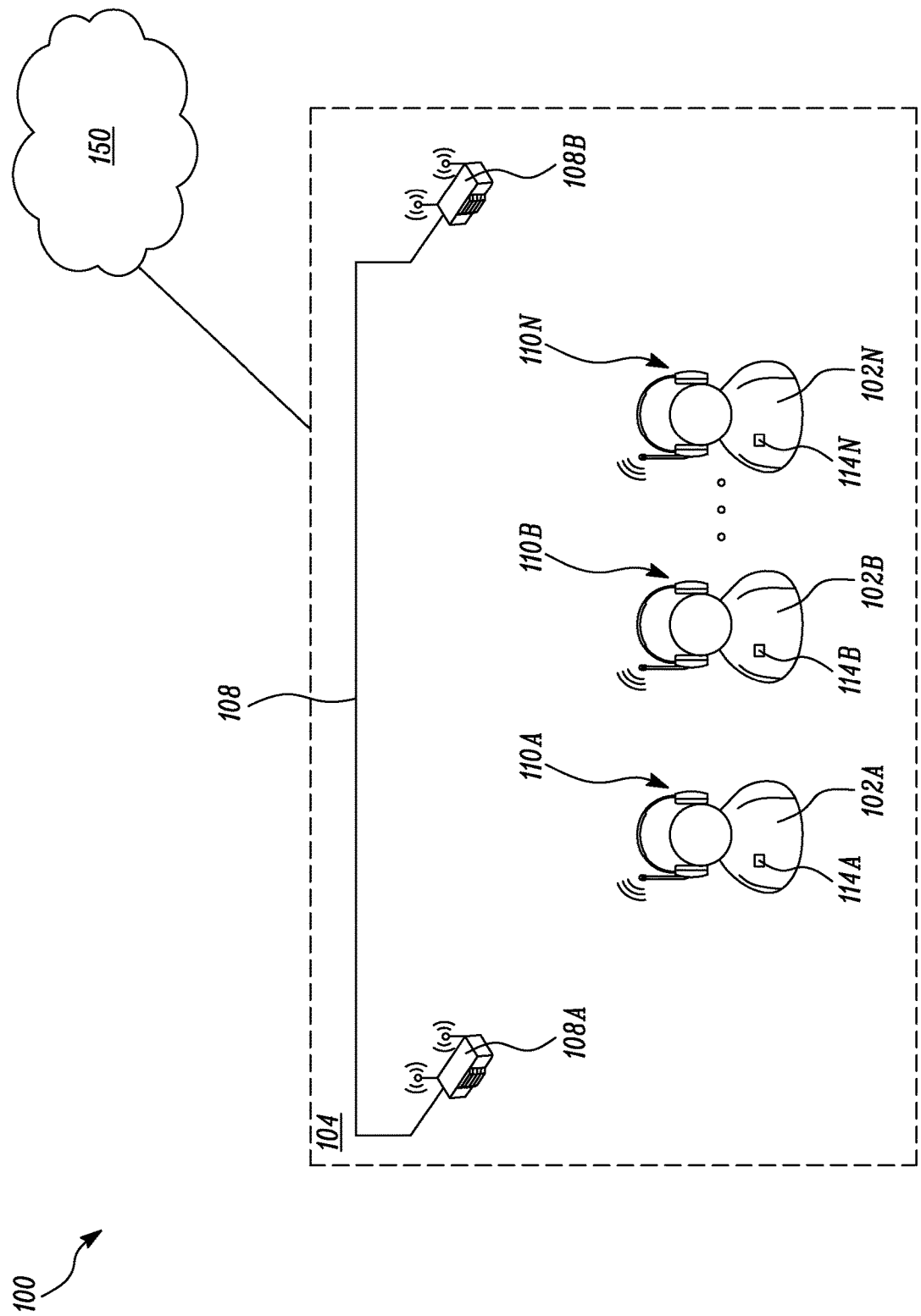
FIG. 1 is a schematic block diagram illustrating a system, in accordance with an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

According to aspects of this disclosure, a system includes at least one article of personal protective equipment (PPE) including at least one functionality that is selectively configurable using a subscription service. The system further includes a first computing device communicatively coupled to the at least one article of PPE and including a first processor and a first memory. The system further includes a second computing device associated with the subscription service and communicatively coupled to the first computing device. The second computing device includes a second processor and a second memory. The first memory includes first instructions that, when executed by the first processor, cause the first processor to generate, in response to determining a selection of the at least one functionality that is configurable using the subscription service, a subscription message comprising a request to enable the at least one functionality of the at least one article of PPE. The second computing device is configured to receive the subscription message, and the second memory includes second instructions that, when executed by the second processor, in response to receiving the subscription message, cause the second processor to determine if credentials corresponding to at least one of the at least one article of PPE and a user associated with the at least one article of PPE are preregistered with the subscription service to enable the at least one functionality of the at least one article of PPE. The second processor is further configured to determine a subscription status of the at least one article of PPE corresponding to the at least one functionality from a subscription server communicatively coupled to the second computing device. The second processor is further configured to transmit, to the first computing device, a configuration message based on the subscription status and in response to determining that the credentials corresponding to the at least one of the at least one article of PPE and the user associated with the at least one article of PPE are preregistered with the subscription service to enable the at least one functionality of the at least one article of PPE. The configuration message includes configuration data to enable the at least one functionality of the at least one article of PPE. The first memory includes the first instructions that, when executed by the first processor, cause the first processor to, in response to receiving the configuration message, enable the at least one functionality of the at least one article of PPE based at least in part on the configuration data of the configuration message.

The system may allow the at least one article of PPE to enable the at least one functionality through the subscription service. Thus, the user of the at least one article of PPE may have access to multiple other features that are not already available with the at least one article of PPE. Further, the user may not need to purchase multiple articles of PPE separately to have access to different functionalities. Further, the user may only need to purchase only one article of PPE and may buy features or functionalities depending upon changing application requirements. Such an arrangement may promote adaptability of the at least one article of PPE for different applications. This may reduce a number of versions of the article of PPE as a number of functionalities can be enabled through the subscription service.

The second processor associated with the subscription service may check if the credentials corresponding to the at least one article of PPE or the user associated with the at least one article of PPE are preregistered with the subscription service. This may improve safety of the system such that only predetermined articles of PPE may gain access to the at least one functionality.

The second processor may further check if the user of the at least one article of PPE has subscribed to the at least one functionality through the subscription server by obtaining the subscription status corresponding to the at least one functionality. This may ensure that the user have access to the correct functionality intended to be subscribed by the user.

As used herein, the term "network" may refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.). The term "network" may be associated with transmission of messages, packets, signals, and/or other forms of information between and/or within one or more network devices. In some examples, the network may include one or more wired and/or wireless networks operated in accordance with any communication standard that is or becomes known or practicable.

As used herein, the term "server" may refer to any computerized component, system or entity regardless of form which is adapted to provide data, files, applications, content, or other services to one or more other devices or entities on a network.

As used herein, the term "subscription server" may refer to any computerized component, system or entity regardless of form which is adapted to provide subscription information to one or more other devices or entities on a network. The subscription information may include information such as, but not limited to, authorized subscribers, any special permissions/restrictions based on type of subscribers, list of services and type of services to be provided, payment data, payment transaction files, content, or other transaction-related services.

As used herein, the term "user interface" may refer to, without limitation, any visual, graphical, tactile, audible, sensory, or other means of providing information to and/or receiving information from a user or any other entity.

As used herein, the term "wireless" may refer to any wireless signal, data, communication, or other interface including, without limitation, Wi-Fi, Bluetooth®, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

As used herein, the terms "World Wide Web" or "Web" may refer generally to both (i) a distributed collection of interlinked, user-viewable hypertext documents (commonly referred to as Web documents or Web pages) that are accessible via the Internet, and (ii) client and server software components which provide user access to such documents using standardized Internet protocols.

As used herein, the term "Web-site" may refer to a computer system that serves informational content over a network using the standard protocols of the World Wide Web. Typically, a web-site corresponds to a particular Internet domain name and includes the content associated with a particular organization. As used herein, the term is generally intended to encompass both (i) hardware/software server components that serve informational content over the network, and (ii) "back end" hardware/software components, including any non-standard or specialized components, that interact with the server components to perform services for web-site users.

As used herein, the terms "message" or "messages" may refer to any form of electronic communication between two or more computing devices. Messages may include text messages, photos, stickers or other icons, videos, voice recordings, music, voice mails, etc. In one or more embodiments, a message may be an instant message communicated in real-time or near real-time.

In addition, the term "subscription message" may refer generally to a message that indicates subscription information that allows a system to initiate a subscription service. For example, a subscription message may include a data package that includes a type of service, a sender, a recipient, a service method, formatting indicating how the system processes the service, etc.

As used herein, the term "payment transaction" may refer to any type of electronic transaction exchanging currency or credits between two or more entities. For example, a payment transaction may be a financial electronic transaction between two users of a payment system. In another example, the payment transaction may be a financial electronic transaction between a user and a financial institution or any other multi-person entity. Additionally, the payment transaction may represent a payment in consideration for a purchase of goods and/or services, or any other type of monetary transfer.

As used herein, the term "virtual assistant" may refer to any software, hardware, or any hybrid hardware/software application that provides assistance to humans analogous to that provided by human assistants, generally using an intuitive user interface, such as the one that allows a user to express needs in a natural language.

As used herein, the term "headset" may refer to a device that includes one or more speakers, and that may, or may not, include a microphone. The headset may include any suitable type of audio headset, for example, but not limited to, earmuffs, headphones, over-the-ear headphones, earbuds, earbud-type headphones with ear hooks, in-ear headphones that extend partially into an ear canal, etc.

As used herein, the term "communication" may refer to any information, data, and/or signal that is provided, transmitted, received, and/or otherwise processed by an entity, and/or that is shared or exchanged between two or more people, devices, and/or other entities.

As used herein, the term "communication channel" may refer to any means of communication that enables or supports a communication interaction or an exchange of information between two or more devices or parties. The term may also refer to a shared bus configured to allow communication between two or more devices, or to a point-to-point communication link configured to allow communication between only two devices or parties.

As used herein, the term "transceiver" may refer to any component or group of components that is capable of at least transmitting communication signals and at least receiving communication signals.

As used herein, the term "application" may refer generally to a unit of executable software that implements a certain functionality or theme. The themes of applications may vary broadly across any number of disciplines and functions (such as, on-demand content management, e-commerce transactions, brokerage transactions, home entertainment, calculator, etc.), and one application may have more than one theme.

FIG. 1 is a schematic block diagram illustrating a system 100 according to an embodiment of the present disclosure. The system 100 includes at least one article of personal protective equipment (PPE) 110A-110N (collectively, article of PPE 110). The article of PPE 110 may be used to protect users 102A-102N (collectively, users 102) from harm or injury from a variety of factors in an ambient environment 104. The at least one article of PPE 110 may also be interchangeably referred to herein as "the article of PPE 110". In some examples, the article of PPE 110 is a headset.

As used herein, the term "protective equipment" may include any type of equipment or clothing that may be used to protect a user from hazardous or potentially hazardous conditions. In some examples, one or more individuals, such as the users 102, may utilize the article of PPE while engaging in tasks or activities within the ambient environment 104. In some examples, the article of PPE may be associated with the respective users 102.

Examples of PPE articles may include, but are not limited to, hearing protection (including ear plugs and ear muffs), respiratory protection equipment (including disposable respirators, reusable respirators, powered air purifying respirators, self-contained breathing apparatus and supplied air respirators), facemasks, oxygen tanks, air bottles, protective eyewear, such as visors, goggles, filters or shields (any of which may include augmented reality functionality), protective headwear, such as hard hats, hoods or helmets, protective shoes, protective gloves, other protective clothing, such as coveralls, aprons, coat, vest, suits, boots and/or gloves, protective articles, such as sensors, safety tools, detectors, global positioning devices, mining cap lamps, fall protection harnesses, exoskeletons, self-retracting lifelines, heating and cooling systems, gas detectors, and any other suitable gear configured to protect the users 102 from injury. The PPE articles may also include any other type of clothing or device/equipment that may be worn or used by the users 102 to protect against extreme noise levels, extreme temperatures, fire, reduced oxygen levels, explosions, reduced atmospheric pressure, radioactive and/or biologically harmful materials.

In some examples, the article of PPE 110 may be used by emergency personnel, for example, firefighters, law enforcement, first responders, healthcare professionals, paramedics, HAZMAT workers, security personnel, or other personnel working in hazardous or potentially hazardous conditions, for example, chemical environments, biological environments, nuclear environments, fires, or other physical environments, for example, industrial sites, construction sites, agricultural sites, mining or manufacturing sites.

As used herein, the term "hazardous or potentially hazardous condition" may refer to environmental conditions that may be harmful to a human being, such as high noise levels, high ambient temperatures, lack of oxygen, presence of explosives, exposure to radioactive or biologically harmful materials, and exposure to other hazardous substances. Depending upon the type of safety equipment, environmental conditions and physiological conditions, corresponding thresholds or levels may be established to help define hazardous and potentially hazardous conditions.

In some examples, the article of PPE 110 may include one or more headsets. For example, the headset may be a part of hearing protection, such as earmuffs, ear plugs, etc. In some examples, the article of PPE 110 includes at least one functionality F that is selectively configurable using a subscription service 150. The at least one functionality F may also be interchangeably referred to herein as "the functionality F".

As used herein, the term "subscription" shall be understood to refer to and encompass a variety of legal mechanisms. Some relevant examples include, but these teachings are not limited to, subscription mechanisms, such as time-limited rights of access (as where a subscription provides access rights for a specific period of time, such as one year, in exchange for a corresponding series of payments), event-limited rights of access (as where a subscription provides access rights during the life of a given subscriber based upon an up-front payment in full and where those access rights terminate upon delisting of the subscriber or where, for example, a company purchases a subscription for a key employee and those corresponding rights of access terminate when and if that key employee leaves the employment of that company), rights of access predicated upon a series of periodic payments (as where a subscription provides access rights during, for example, predetermined periods of time on a periodic basis as where a subscriber offers month-by-month or yearly payments to gain corresponding month-by-month or yearly access rights), rights of access predicated upon a one-time payment (as may occur when a subscriber makes a single payment to obtain a time-based or event-based duration of access rights or, if desired, when a single payment serves to acquire a perpetual right of access that may be retained, transferred, inherited, or the like), membership-based rights of access (as may occur when the subscription, by its terms and conditions, establishes a membership interest with respect to the accorded right of access such as, for example, a club-based membership), and fractionally-based rights of access (as may occur when the subscription, by its terms and conditions, establishes a divided or undivided co-ownership interest by and between multiple subscription beneficiaries).

In some examples, the article of PPE 110 may be able to send and/or receive data by way of one or more wired and/or wireless communication interfaces. In some examples, the one or more wireless communication interfaces may include transceivers for transmitting and receiving radio signals. In some examples, the article of PPE 110 may be configured to communicate data via wireless communication protocols, such as via 802.11 Wi-Fi protocols, Bluetooth® protocols, or any other radio communication protocol.

In some examples, the ambient environment 104 may include a network 108 (e.g., a local area network) through which the article of PPE 110 may communicate with each other and/or the subscription service 150. For example, the ambient environment 104 may be configured with wireless technology, such as 802.11 wireless networks, 802.15 ZigBee networks, and/or the like.

In the example of FIG. 1, the ambient environment 104 includes a wireless local area network (WLAN) that provides a packet-based transport medium to allow communication with the subscription service 150 via the network 108. In addition, the ambient environment 104 includes a plurality of wireless access points 108A, 108B that may be geographically distributed throughout the ambient environment 104 to provide support for wireless communications throughout the ambient environment 104. The articles of PPE 110 may, for example, communicate with the subscription service 150 through the wireless access points 108A, 108B.

In some examples, the network 108 may include one or more of a wireless network, a wired network, a local area network (LAN), a metropolitan area network (MAN), a wide area network (WAN), a wireless personal area network (WPAN), WiMax networks, a direct connection, such as through a Universal Serial Bus (USB) port, and/or the like, and may include a set of interconnected networks that make up the Internet. In some examples, the wireless network may include a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc. In some examples, the network 108 may include a circuit-switched voice network, a packet-switched data network, or any other network capable for carrying electronic communication. For example, the network 108 may include networks based on the Internet protocol (IP) or asynchronous transfer mode (ATM), etc.

Examples of the communication network may further include, but are not limited to, a personal area network (PAN), a storage area network (SAN), a home area network (HAN), a campus area network (CAN), an enterprise private network (EPN), the Internet, a global area network (GAN), and so forth. Examples are intended to include or otherwise cover any type of network, including known, related art, and/or later developed technologies to connect the article of PPE 110 with each other or the subscription service 150.

In some examples, the article of PPE 110 may communicate directly with the subscription service 150 through any wired or wireless communication means or via an external network. In some examples, the article of PPE 110 may communicate with the subscription service 150 when connected to a charging or docking station. The charging or docking station may include the wired or wireless communication means for communicating with the subscription service 150. Thus, the article of PPE 110 may be able to communicate with the subscription service 150 through the charging or docking station. In some examples, the articles of PPE 110 may include various components, such as a microphone and a speaker, mounted thereon or otherwise accessible to the article of PPE 110. Specifically, the article of PPE 110 may transmit speech data through the microphone. Further, the article of PPE 110 may receive speech data through the transceiver.

In some examples, the system 100 may further include a user interface 114 configured to allow the selection of the at least one functionality F that is selectively configurable using the subscription service 150. For example, the user interface 114 may be incorporated into any type of software applications, including, for example, desktop applications, mobile applications, or web-based applications (e.g., a website), to enable the user 102 to interact with and control the at least one functionality F associated with the article of PPE 110 that is configurable using the subscription service 150. In some examples, one or more user interfaces 114A-114N (collectively, the user interface 114) are associated with each article of PPE 110A-110N and/or the users 102A-102N.

In some examples, the user interface 114 may be associated with at least one of the article of PPE 110 and the users 102. In some examples, the article of PPE 110 may communicate with the subscription service 150 through any suitable computing device, such as, for example, a personal computer, a laptop computer, a cellular telephone, a smartphone, or a tablet computer. Such a computing device may include the user interface 114 for selection of the functionality F. Further, the computing device may include associated wired/wireless communication interface for communicating with the article of PPE 110 and/or the subscription service 150. In some examples, the article of PPE 110 may communicate with the subscription service 150 through the aforementioned computing device.

Figure 2:
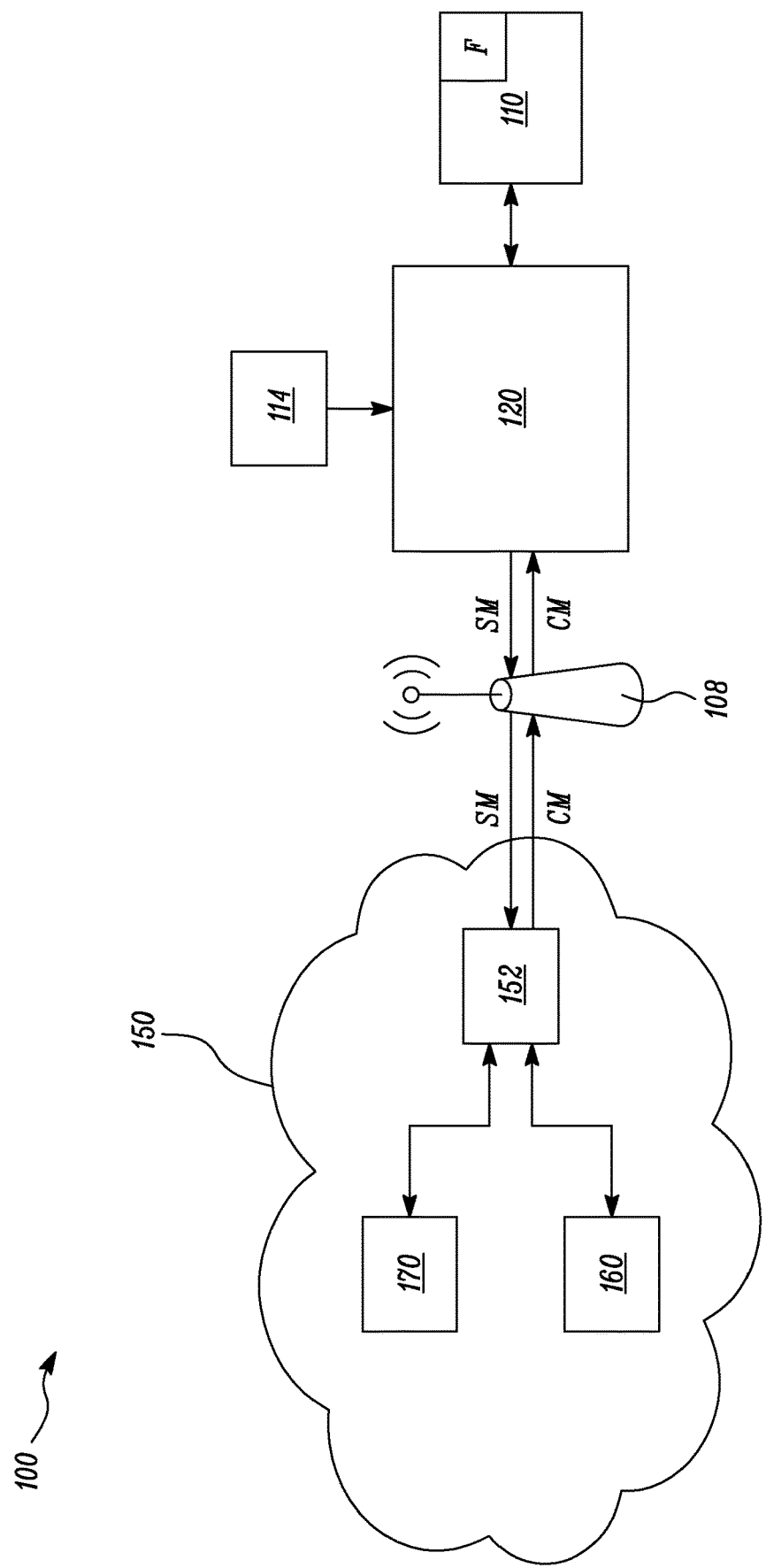
FIG. 2 is a schematic block diagram illustrating the system of FIG. 1, according to another embodiment of the present disclosure.

FIG. 2 is a schematic block diagram illustrating the system 100 according to another embodiment of the present disclosure. The system 100 includes the article of PPE 110 communicably coupled to the subscription service 150 through the network 108 (or the wireless access points 108A, 108B shown in FIG. 1) or a wireless internet gateway. As used herein, the terms "Internet" and "internet" are used interchangeably to refer to inter-networks including, without limitation, the Internet.

In some examples, the subscription service 150 may comprise a cloud computing service. As used herein, the phrase "cloud computing service" may refer to any service, platform, and/or infrastructure that is capable of providing online and/or third-party hosting for applications and/or storage. Examples of such cloud computing services may include, without limitation, Software-as-a-Service ("SaaS") systems and Infrastructure-as-a-Service ("IaaS") systems.

In some examples, the cloud computing service may provide one or more clients with a view of applications and data without providing the client complete access to all underlying systems. For example, a cloud computing service may allow a consumer to specify service requirements and/or resource requirements for one or more applications and/or virtual machines without requiring and/or allowing the consumer to control the underlying hardware resources. Examples of such cloud computing services may include, without limitation, Microsoft Azure IoT Hub, Amazon Web Services Greengrass, etc.

In some examples, the subscription service 150 may enable the functionality F of the article of PPE 110. For example, the subscription service 150 may provide support for the functionality F. The system 100 includes a first computing device 120 communicatively coupled to the article of PPE 110. The first computing device 120 may or may not be disposed on the article of PPE 110. For example, the first computing device 120 may be communicatively coupled to the article of PPE 110 through any wired/wireless communication interface.

The system 100 further includes a second computing device 152 associated with the subscription service 150 and communicatively coupled to the first computing device 120. In some examples, the first computing device 120 may communicate with the second computing device 152 associated with the subscription service 150 for enabling the functionality F of the article of PPE 110. For example, the first computing device 120 may transmit a signal (e.g., a subscription message SM) representing a request to enable the functionality F. The first computing device 120 may transmit the signal upon selection of the functionality F by the user 102 (shown in FIG. 1) via, for example, the user interface 114. In the example of FIG. 2, the user interface 114 is communicably coupled to the first computing device 120. However, it should be understood that the user interface 114 may be communicably coupled to the first computing device 120 and/or the article of PPE 110. The first computing device 120 and the second computing device 152 may include respective communication interfaces for enabling communication with each other.

The system 100 further includes a subscription server 160 communicatively coupled to the second computing device 152. The subscription server 160 may provide information such as a subscription status of the user 102 or the article of PPE 110 corresponding to the functionality F to be accessed through the subscription service 150. For example, the subscription status may include a payment status corresponding to the functionality F. In some examples, the subscription service 150 may provide access to the functionality F based on a payment made corresponding to the functionality F. In some examples, the subscription service 150 may provide access to the functionality F free of charge. In such cases, the second computing device 152 may authorize access to the functionality F based on the subscription status from the subscription server 160. In some examples, the second computing device 152 may seek subscription information from the subscription server 160 upon reception of the request to enable the functionality F of the article of PPE 110 from the first computing device 120.

The system 100 further includes a feature server 170 communicatively coupled to the second computing device 152. The second computing device 152 may transmit a configuration message CM corresponding to the at least one functionality F to the first computing device 120 based on the subscription status of the user 102 or the article of PPE 110. The first computing device 120 may configure the at least one functionality F on the article of PPE 110 based on the configuration message CM.

The feature server 170 may access or include a database that stores a number of functionalities F associated with the article of PPE 110. In some embodiments, the at least one functionality F includes at least one of a conference calling function, a level-dependent function, a virtual assistant, a noise dosimetry function, a computer vision function, a data collection and analytics function, a wireless network calling function, an emergency function, a safety function, a Frequency Modulation (FM) radio, a Digital Audio Broadcasting (DAB) radio, and a profile for a work equipment.

In some examples, the functionality F includes the conference calling function that allows the user 102 to communicate with multiple other users that participate in call conferencing. In some examples, the article of PPE 110 (e.g., a headset) may use a cellular network to establish a conference call with other participants. The article of PPE 110 may include one or more wired and/or wireless communication interfaces that enables the conference calling function. For example, the article of PPE 110 may be equipped with communication circuitry, such as 3G/4G/LTE/WiMax. In some examples, the one or more wireless communication interfaces may include transceivers for transmitting and receiving radio signals.

In some examples, the article of PPE 110 may use a network (e.g., the network 108) for conferencing calling function. In some examples, the transceiver may include a two-way radio which may be portable, e.g., hand-held two-way radio. In some examples, the two-way radio may include a push-to-talk (PTT) switch. In some examples, the functionality F includes the wireless network calling function. For example, the article of PPE 110 may use the network to call another user through VoIP (Voice over Internet Protocol).

In some examples, the article of PPE 110 may include one or more microphones disposed on the article of PPE 110. The microphone may pick up sound and noise from surrounding environment of the user 102 of the article of PPE 110. The noise and sounds picked up by the microphone may be relayed to the user 102 through a speaker associated with the article of PPE 110. Incoming sound and noise picked up by the microphone may be processed, such as to eliminate at least some of the noise based on level or intensity of the sound to produce an output through the speaker. Such a functionality may be referred to as the level-dependent function. The level-dependent function may include several profiles selectively configurable with the article of PPE 110.

As used herein, the term "sound" may refer to desirable audio information while the term "noise" may refer to undesirable audio information. The speaker of the article of PPE 110 may provide sound to the user 102, such as desirable audio. Desirable audio may include conversations, commands, warnings or other communications, such as communications between two personnel in the vicinity of the article of PPE 110. Inputs from the microphone may be processed to eliminate at least some of the noise, such as undesirable noises. Undesirable noises may include mechanical noises, noises from ventilation systems, distant conversations, impulse noises, grinding, squeaking, engine noises, gun shots, explosions, and/or other similar noises.

The output from the speaker may be limited to a maximum output level so as to protect the ears of the user 102. In some examples, the output from the speaker may be limited to 80 dB when the ambient sound level is less than 106 dB, regardless of a volume setting of the speaker as adjusted by the user 102. The processing may increase a quality or clarity of incoming sound, such as by reducing background noise, suppressing impulse noises or keeping an input level constant.

In some examples, the article of PPE 110 may analyze the external noise and sounds so as to determine the level or amplitude of the external noise and sounds. After analyzing the external noise and sounds, the article of PPE 110 may apply one of more digital filters to the incoming sounds to reduce the external noise. The filters may progressively focus on the frequencies of human voices as the amplitude of the external noise and sound increases. Reducing a bandwidth or focusing on the frequencies of human voices may improve a voice-to-noise ratio and improve a speech intelligibility of verbal commands and conversations in the presence of external noise.

In some examples, the functionality F includes the virtual assistant. In general, virtual assistants are an example of a class of software applications, referred to as natural language interaction applications that use natural language to interact with a human user. With respect to virtual assistants in particular, these applications perform functions similar to those provided by human assistants, in that they may engage in conversations with their users in order to, for example, provide information, carry out routine tasks, or perform other operations as required. In some examples, the functionality F may allow a change of language for communication with the virtual assistant.

In some examples, the functionality F includes the noise dosimetry function that may allow measurement of noise exposure of the user 102 integrated over a period of time. For example, the article of PPE 110 may be equipped with a noise sensor or a sound level monitor that provides the user 102 with the noise dosage (e.g., sound intensity at a particular point in time) and may identify the type or types of noise that contribute to that noise dosage. In some examples, the noise dosimetry function may measure noise level values, such as, peak noise, threshold, exposure, maximum noise level, projected dose, minimum noise level, etc.

In some examples, the functionality F includes the computer vision function. In computer vision, mathematical techniques may be used to detect the presence of various elements and recognize the elements from visual scenes that are depicted in digital images. Localized portions of an image, known as features, may be used to analyze and classify an image. Low-level features, such as interest points and edges, may be computed from an image and used to detect, for example, people, objects, and landmarks that are depicted in the image. Machine learning algorithms are often used for image recognition. In some examples, the article of PPE 110 may include associated hardware for performing the intended functions of the computer vision function.

In some examples, the functionality F includes the data collection and analytics function. The article of PPE 110 may measure health and safety data of the user 102, such as, for example, sound levels or hearing hazards. Further, the articles of PPE 110 may analyze the sound levels on a real-time, periodic, or asynchronous basis. Further, the article of PPE 110 may send such sound level data to a worksite computing device. In some examples, the analytics function may include identification of outliers or anomalies. In some examples, the article of PPE 110 may determine whether a noise threshold has been exceeded and may correspondingly generate an alert or a notification to the user 102. Additionally, the article of PPE 110 may store historical data for future analysis.

In some examples, the at least one functionality F includes the emergency function and/or the safety function. In some examples, the emergency function and/or the safety function may include personal alert safety system (PASS), fall detection, etc. For example, the article of PPE 110 may include a sensor that may monitor physical activity patterns, detect the occurrence of a dangerous condition, and/or recognize body motion patterns leading to falls.

In some examples, the functionality F includes the FM radio or the DAB radio. These functionalities F may allow radio listening functionality on the article of PPE 110. The article of PPE 110 may include associated hardware for using these functionalities F.

In some examples, more than one functionality F may be configured on the article of PPE 110. It should be understood that the functionality F described above are by way of example only, and the functionality F may vary based on application requirements. In some examples, the functionality F may be classified into productivity functions, entertainment functions, and personal safety functions.

Figure 3:
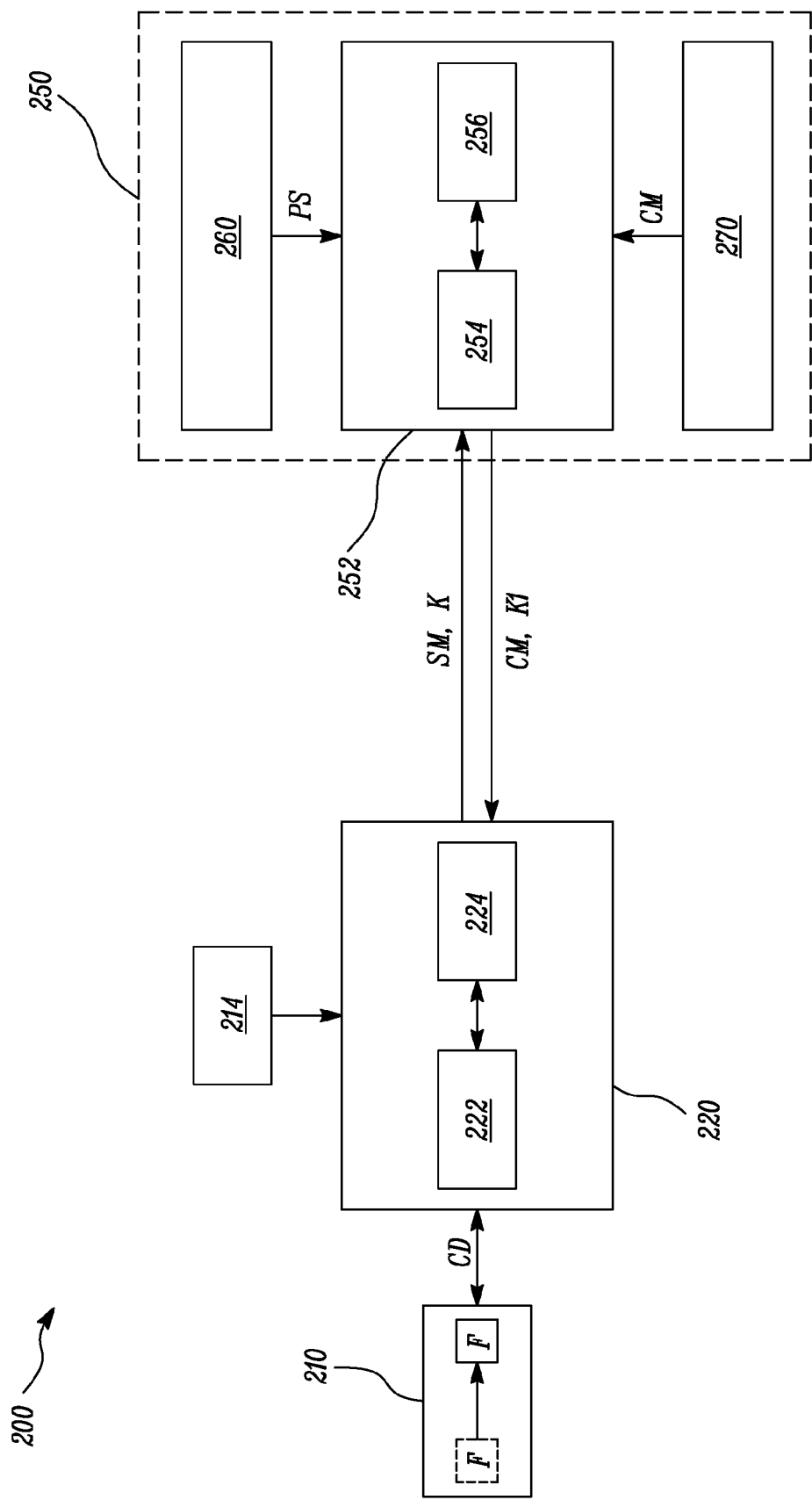
FIG. 3 is a block diagram illustrating a system, in accordance with an embodiment of the present disclosure.

FIG. 3 is a block diagram illustrating a system 200 according to an embodiment of the present disclosure. The system 200 may be similar to the system 100 of FIGS. 1 and 2, and equivalent reference numbers are used to designate same or similar elements. The system 200 includes at least one article of PPE 210 including the at least one functionality F that is selectively configurable using a subscription service 250. The at least one article of PPE 210 may also be interchangeably referred to herein as "the article of PPE 210". The system 200 further includes a first computing device 220 communicatively coupled to the at least one article of PPE 210. The first computing device 220 includes a first processor 222 and a first memory 224.

The system 200 further includes a second computing device 252 associated with the subscription service 250 and communicatively coupled to the first computing device 220. In some examples, the first computing device 220 is communicatively coupled to the subscription service 250. The second computing device 252 includes a second processor 254 and a second memory 256. The system 200 further includes a subscription server 260 communicatively coupled to the second computing device 252. In some examples, the system 200 further includes a feature server 270 communicatively coupled to the second computing device 252.

In some embodiments, the system 200 further includes a user interface 214 communicatively coupled to the first processor 222. The user interface 214 may be communicatively coupled to the first computing device 220. In some examples, the user interface 214 is configured to allow the selection of the at least one functionality F that is selectively configurable using the subscription service 250. In some examples, the user interface 214 may also be communicably coupled to the article of PPE 210.

The first memory 224 includes first instructions that, when executed by the first processor 222, cause the first processor 222 to generate, in response to determining a selection of the at least one functionality F that is configurable using the subscription service 250, the subscription message SM including a request to enable the at least one functionality F of the at least one article of PPE 210. The article of PPE 210 and/or the first computing device 220 may include one or more wired or wireless communication interfaces that enables the article of PPE 210 to communicate with the second computing device 252 of the subscription service 250. The article of PPE 210 may transmit the subscription message SM to the second computing device 252 upon selection of the functionality F through the user interface 214, for example, by a user of the article of PPE 210.

The second computing device 252 is configured to receive the subscription message SM. The second memory 256 includes second instructions that, when executed by the second processor 254, in response to receiving the subscription message SM, cause the second processor 254 to determine if credentials corresponding to at least one of the at least one article of PPE 210 and the user associated with the at least one article of PPE 210 are preregistered with the subscription service 250 to enable the at least one functionality F of the at least one article of PPE 210. In some examples, the credentials may include a device identification (ID) or a user identification (UID) associated with the article of PPE 210.

The article of PPE 210 may be preregistered with the subscription service 250. For example, the article of PPE 210 may be preregistered with the subscription service 250 by an enterprise managing the article of PPE 210. In such an arrangement, the enterprise may manage the type of functionality F that may be enabled on the article of PPE 210. In some examples, the functionality F may be enabled based on a profile of the user of the article of PPE 210. Further, the enterprise may pay for the functionality F of the article of PPE 210 through the subscription service 250. In some examples, the cost of the functionality F may be billed after end of a billing period. In some examples, the functionality F may be subscribed based on a policy. For example, a group of functionalities F may be subscribed together. Further, the cost of the functionalities F may be billed based on usage of the functionalities F. For example, if some of the functionalities F from a group of functionalities F are not used by the user of the article of PPE 210, the associated cost may be excluded at the end of the billing period.

In some embodiments, the second processor 254 is further configured to preregister the at least one article of PPE 210 with the second computing device 252 for enabling the at least one functionality F of the at least one article of PPE 210. The second memory 246 may store the credentials corresponding to the article of PPE 210. Alternatively, or additionally, a manufacturer of the article of PPE 210 may provide credentials of the one or more article of PPE 210 to the subscription service 250. Further, the manufacturer may limit the functionality F that can be enabled on the article of PPE 210, for example, based on a region or a location of use of the article of PPE 210.

In some examples, the user of the article of PPE 210 may license the functionality F through the subscription service 250. For example, the users may obtain a license to enable the functionality F that meet their specific needs by paying a fee to the subscription service 250. The payment corresponding to the functionality F may then be stored with the subscription server 260. The article of PPE 210 or the first processor 222 may correspondingly generate the subscription message SM to enable the functionality F. The subscription service 250 may then determine if the credentials associated with at least the article of PPE 210 or the user of the article of PPE 210 are preregistered to enable the at least one functionality F. In some examples, some of the functionalities F may be available without any fee. Further, some of the functionalities F may be available only to specific users.

The second processor 254 is further configured to determine a subscription status PS of the at least one article of PPE 210 corresponding to the at least one functionality F from the subscription server 260 communicatively coupled to the second computing device 252. In some examples, the subscription service 250 may provide access to the functionality F based on a payment made corresponding to the functionality F. The subscription service 250 may include arrangements for accepting payments corresponding to the functionality F that the user of the article of PPE 210 wishes to enable. Further, payment information may be stored with the subscription server 260. The subscription status PS may include the payment information associated with the functionality F.

In some examples, the subscription service 250 may provide access to the functionality F free of charge. The subscription server 260 may store information corresponding to the articles of PPE 210 or the users associated with the articles of PPE 210 that are authorized to assess the functionality F free of charge. Such information may be provided by the subscription server 260 to the second processor 254 through the subscription status PS of the article of PPE 210.

In some embodiments, the second processor 254 is further configured to authenticate the at least one article of PPE 210 based at least on a pre-shared key K associated with the at least one article of PPE 210. The pre-shared key K may uniquely identify the article of PPE 210 for secure communication with the article of PPE 210. For example, the first processor 222 may encrypt the subscription message SM using the pre-shared key K that is available to both the first processor 222 and the second processor 254. The second processor 254 may then authenticate the article of PPE 210 based on the pre-shared key K associated with the subscription message SM.

As used herein, the term "key" refers to an information (e.g., a string of characters) used with cryptographic algorithms to encrypt or decrypt data. The generation of such keys depends on cryptographic algorithms used. A key may be a single key used for both encryption and decryption in cryptography. That is, in such a cryptography, decryption is the reverse of encryption and uses the same key as encryption. Such a cryptography may be referred to as 'conventional cryptography' or 'symmetric cryptography.' In this cryptography, a single secret key is shared by users or processes concerned with gaining access to information from a resource and also by security systems concerned with controlling or providing secure access to a resource. Through this arrangement, the second processor 254 may determine if the subscription message SM is obtained from a genuine article of PPE that is authorized to communicate with the subscription service 250. In some examples, the subscription service 250 may be configured to authenticate the article of PPE 210 through a single sign-on (SSO) authentication scheme.

The second processor 254 is further configured to transmit, to the first computing device 220, the configuration message CM based on the subscription status PS and in response to determining that the credentials corresponding to the at least one of the at least one article of PPE 210 and the user associated with the at least one article of PPE 210 are preregistered with the subscription service 250 to enable the at least one functionality F of the at least one article of PPE 210. The configuration message CM includes configuration data CD to enable the at least one functionality F of the at least one article of PPE 210. In some embodiments, the second processor 254 is further configured to transmit the configuration message CM to the first computing device 220 through the feature server 270. In some examples, the feature server 270 may store the configuration data CD corresponding to the at least one functionality F.

The first memory 224 includes the first instructions that, when executed by the first processor 222, cause the first processor 222 to, in response to receiving the configuration message CM, enable the at least one functionality F of the at least one article of PPE 210 based at least in part on the configuration data CD of the configuration message CM. For example, the first processor 222 may allow the at least one article of PPE 210 to use the at least one functionality F based on the reception of the configuration message CM. Alternatively, in some examples, the configuration data CD of the configuration message CM may restrict the at least one functionality F already enabled on the article of PPE 210. For example, the functionality F of the article of PPE 210 may be restricted based on factors such as a location of the article of PPE 210, a profile of the user of the article of PPE 210, etc. For example, the functionality F may be enabled or active within one or more predetermined regions and disabled or inactive outside the one or more predetermined regions. A dashed box in FIG. 3 represents the functionality F in disabled or inactive state. A solid box in FIG. 3 represents the functionality F in enabled or active state.

In some embodiments, the first processor 222 is further configured to configure the at least one functionality F based at least in part on the configuration data CD of the configuration message CM. For example, the configuration data CD may include one or more software that may update a configuration setting of article of PPE 210 to enable the functionality F of the article of PPE 210. The first processor 222 is communicatively coupled to the article of PPE 210 and may transmit the configuration data CD to the article of PPE 210.

Various features and devices shown in FIG. 3 may also be enabled in the system 100 of FIGS. 1 and 2.

By way of example, and not limitation, each of the first memory 224 and the second memory 256 may include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer or a processor.

Figure 4:
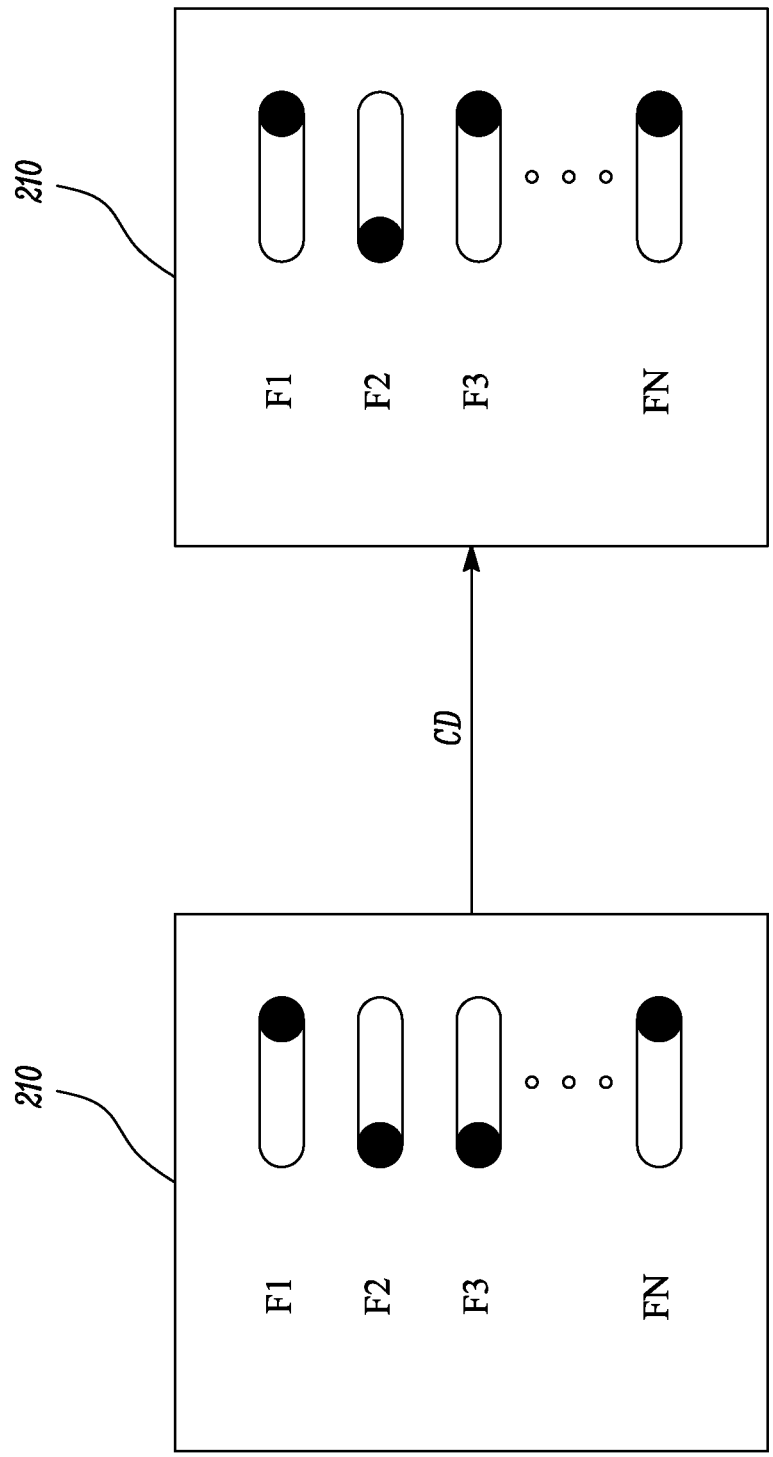
FIG. 4 is a schematic block diagram illustrating an article of PPE, in accordance with an embodiment of the present disclosure.

FIG. 4 is a schematic block diagram illustrating the article of PPE 210. Referring now to FIGS. 3 and 4, the article of PPE 210 may include multiple functionalities F1-FN (collectively, functionality F) that are selectively configurable using the subscription service 250. The first processor 222 may configure the functionalities F1-FN based on the reception of the configuration message CM from the second computing device 252 including the configuration data CD.

In the example shown in FIG. 4, the functionality F3 may be configured on the article of PPE 210 upon reception of the configuration data CD. In some examples, the configuration data CD may include a software for using the functionality F3. Further, in some embodiments, multiple functionalities F1-FN may be configured simultaneously through the configuration data CD. Alternatively, multiple functionalities F1-FN may be restricted for usage based on the reception of the configuration data CD. For example, the one or more functionalities F1-FN may be disabled on the article of PPE 210 upon entering a location.

In some embodiments, the first processor 222 is further configured to periodically check for one or more configuration messages CM from the second computing device 252 to enable the functionality F of the article of PPE 210. For example, the first processor 222 may transmit the subscription message SM periodically after a predetermined period of time. In some examples, the first processor 222 may check for software updates to the configuration of the functionality F already enabled on the article of PPE 210. In some embodiments, the first processor 222 is further configured to disable the at least one functionality F of the at least one article of PPE 210 upon non-reception of the one or more configuration messages CM from the second computing device 252 after a predetermined period of time.

In some embodiments, the second processor 254 is further configured to at least partially encrypt or digitally sign the configuration message CM based on a key K1 (shown in FIG. 3) before transmitting the configuration message CM to the first computing device 220. Such an arrangement may be a part of "Public key cryptography". Public key cryptography is cryptography using two keys, one for encryption and one for decryption. Users or processes concerned with gaining access to a resource, each have two keys, a public key that can be made available to the whole world is typically used to encrypt messages, and a private key never revealed is typically used to decrypt the encrypted messages. In public key cryptography, encryption and decryption utilize two mathematical functions that are inverse of one another.

Figure 5B:
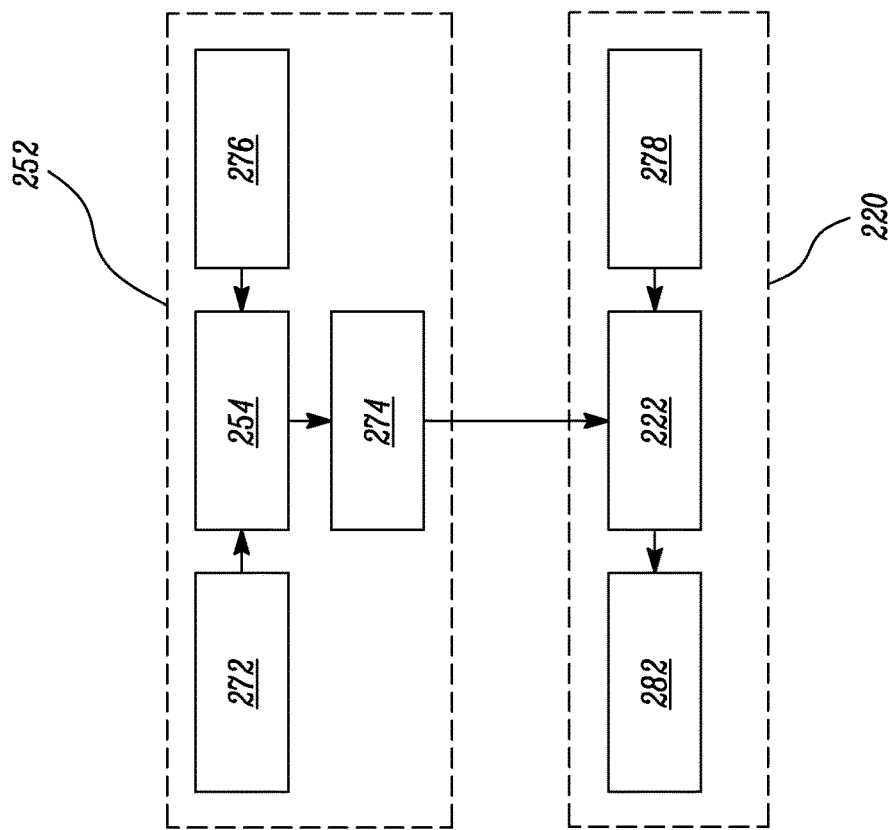
FIGS. 5A-5B are schematic block diagrams illustrating cryptographic protocols of a configuration message, in accordance with an embodiment of the present disclosure.
Figure 5A:
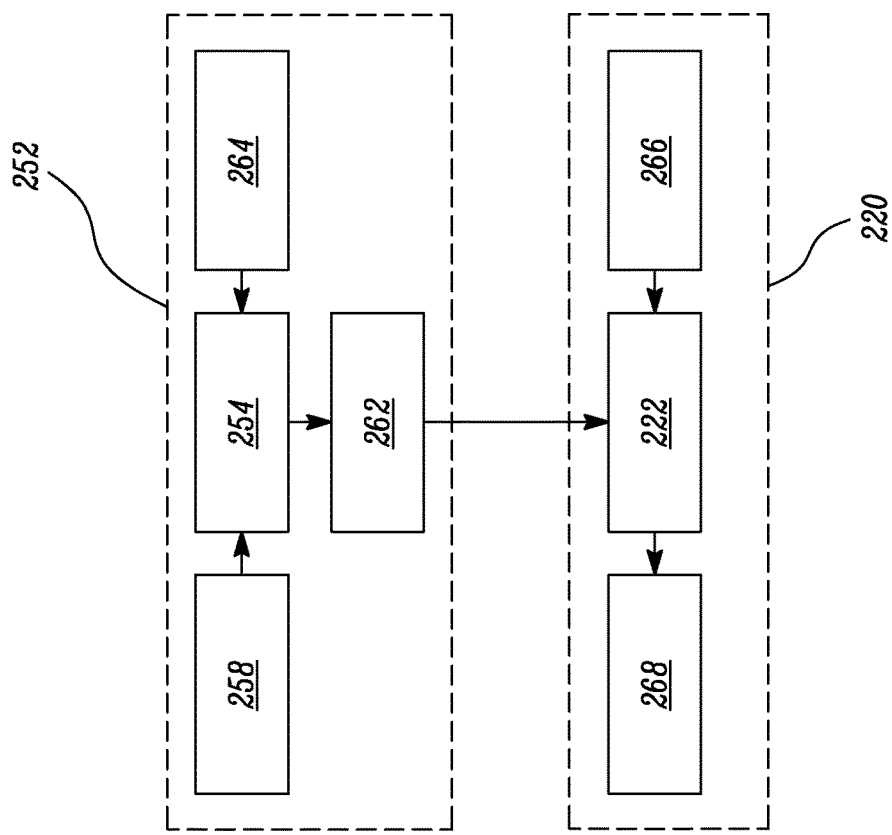

FIGS. 5A and 5B are schematic block diagrams illustrating cryptographic protocols of the configuration message CM. Referring to FIG. 5A, the second processor 254 is configured to digitally sign at the second computing device 252 a configuration message 258 based on a private key 264 associated with the second computing device 252 to form a configuration message 262. In the illustrated embodiment of FIG. 5A, the key K1 (shown in FIG. 3) is the private key 264 associated with the second computing device 252. For example, the second processor 254 may digitally sign the configuration message 258 with the private key 264. The private key 264 may be unique and known only to the second computing device 252. The configuration message 262 may then be transmitted to the first computing device 220.

In some embodiments, the first processor 222 is further configured to verify the digital signature of the configuration message 262 based on a public key 266 corresponding to the private key 264 before enabling the at least one functionality F on the at least one article of PPE 210 (not shown). The first processor 222 may verify the origin of the configuration message 262 through the public key 266. The first processor 222 may convert the configuration message 262 into a configuration message 268 to further obtain the configuration data CD associated therewith.

Referring to FIG. 5B, the second processor 254 may at least partially encrypt a configuration message 272 to form a configuration message 274 that is encrypted based on the key K1 (shown in FIG. 3). In the illustrated embodiment of FIG. 5B, the key K1 is a public key 276 associated with the at least one article of PPE 210 (not shown). In some embodiments, the first processor 222 is further configured to decrypt the configuration message 274 to obtain a configuration message 282 based on a private key 278 corresponding to the public key 276 before enabling the at least one functionality F on the at least one article of PPE 210. Only the article of PPE 210 having the private key 278 will be able to decrypt the configuration message 274 encrypted using the public key 276 associated with the article of PPE 210.

Encryption and decryption features shown in FIGS. 5A and 5B may also be enabled in the system 100 of FIGS. 1 and 2.

Figure 6:
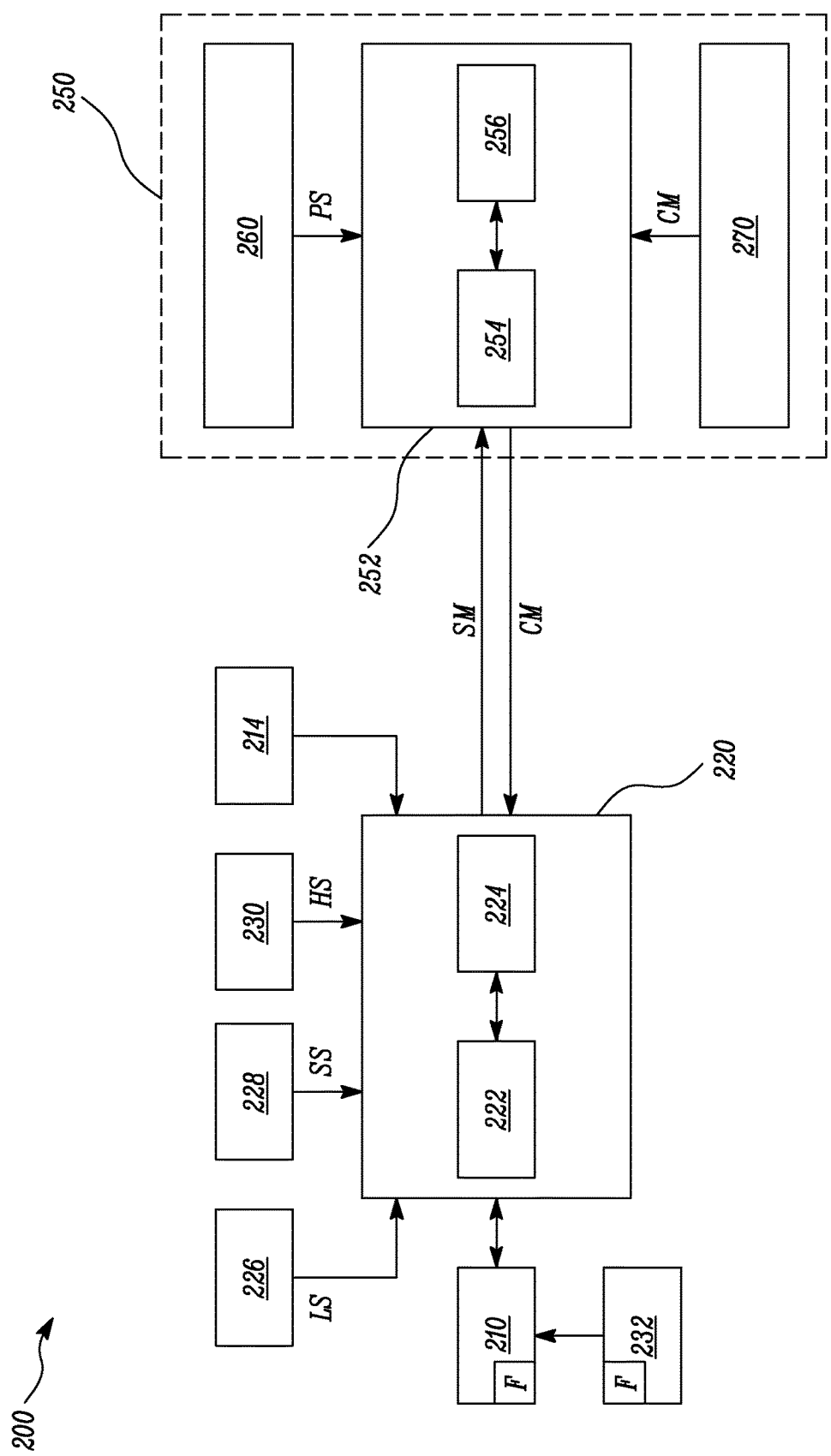
FIG. 6 is a block diagram illustrating the system of FIG. 3, in accordance with another embodiment of the present disclosure.

FIG. 6 is a block diagram illustrating the system 200 according to another embodiment of the present invention. The system 200 includes the first computing device 220 communicatively coupled to the article of PPE 210, and including the first processor 222 and the first memory 224. The system 200 further includes the second computing device 252 associated with the subscription service 250 and communicatively coupled to the first computing device 220. The second computing device 252 includes the second processor 254 and the second memory 256. The system 200 further includes the subscription server 260 and the features server 270 communicatively coupled to the second computing device 252. The system 200 further includes the user interface 214 configured to allow the selection of the functionality F that is selectively configurable using the subscription service 250.

In some embodiments, the system 200 further includes a location device 226 communicatively coupled to the first processor 222 and configured to generate a location signal LS based on a location of the at least one article of PPE 210. In some examples, the location device 226 may be disposed on the article of PPE 210 and/or a user of the article of PPE 210. In some other examples, the location device 226 may be located in an ambient environment (e.g., the ambient environment 104) of the article of PPE 210. The location device 226 is communicatively coupled to the first processor 222 through any wired or wireless communication interface.

In some embodiments, the first processor 222 is further configured to receive the location signal LS from the location device 226. In some embodiments, the first processor 222 is further configured to generate the subscription message SM including the request to enable the at least one functionality F of the at least one article of PPE 210 further based on the location signal LS received from the location device 226. For example, the first processor 222 may generate the subscription message SM upon the article of PPE 210 entering a location that requires the use of the functionality F. The functionality F may include, for example, a safety feature, such as PASS, fall detector, etc. Such functionalities F may be particularly helpful for emergency personnel, for example, firefighters, law enforcement, first responders, HAZMAT workers, security personnel, or other personnel working in hazardous or potentially hazardous conditions.

In some embodiments, the first processor 222 is further configured to at least partially restrict the at least one functionality F based on the location signal LS of the at least one article of PPE 210. For example, the first processor 222 may restrict the use of the functionality F, such as, for example, a music player, a radio, hearing protection, etc., based on the location of the article of PPE 210. In some examples, the first processor 222 may temporarily disable the functionality F based on the location of the article of PPE 210. In some other examples, the first processor 222 may temporarily disable the functionality F for a predetermined period of time based on the location of the article of PPE 210.

In some embodiments, the system 200 further includes at least one sensor 228 communicatively coupled to the first processor 222. In some embodiments, the at least one sensor 228 is configured to generate a signal SS based on detection of at least one environmental condition of the at least one article of PPE 210. In some embodiments, the at least one environmental condition includes at least one of a hazardous condition, a potentially hazardous condition and a behavior of other personnel in the vicinity of the user of the article of PPE 210. In some examples, the behavior of the other personnel may include any activity that may be harmful to the user of the article of PPE 210. In some examples, the at least one sensor 228 may include a temperature sensor, a pressure sensor, a humidity sensor, a sound acquisition device, a video recorder, an image capturing device, a gas sensor, a smoke detector, and/or the like.

The first processor 222 is further configured to receive the signal SS from the at least one sensor 228. In some embodiments, the first processor 222 is further configured to generate the subscription message SM including the request to enable the at least one functionality F of the at least one article of PPE 210 further based on the signal SS received from the at least one sensor 228. For example, the at least one functionality F as a safety feature (e.g., a safety alarm) may be enabled on the article of PPE 210 when a hazardous or potentially hazardous condition is detected by the at least one sensor 228. In such cases, the cost of the functionality F may be billed afterwards.

In some embodiments, the system 200 further includes at least one physiological sensor 230 communicatively coupled to the first processor 222. In some examples, the at least one physiological sensor 230 may be disposed on the article of PPE 210 or on the user of the article of PPE 210. The at least one physiological sensor 230 is configured to generate a signal HS based on detection of at least one physiological condition of the user of the article of PPE 210. In some examples, the at least one physiological condition may include any condition which may result in injury and/or death of an individual.

In some examples, the at least one physiological sensor 230 may include, but not limited to, digital potentiometers, resistive temperature devices (RTD), thermocouples, thermistors, infrared (IR) sensors, pressure sensors, gas detectors, radiation detectors, bio-sensors, optical sensors, video cameras, or any other physiological sensor. In some examples, the at least one physiological sensor 230 may be used to monitor various physiological conditions, such as respiration rate, blood oxygen level, core body temperature, heart rate and/or any other physiological condition required to identify, monitor, or evaluate the physiological condition of the users of the article of PPE 210.

The first processor 222 is further configured to receive the signal HS from the at least one physiological sensor 230. The first processor 222 is further configured to generate the subscription message SM including the request to enable the at least one functionality F of the at least one article of PPE 210 further based on the signal HS received from the at least one physiological sensor 230. For example, the functionality F may include a health data analytics function that may monitor and analyze physiological parameters of the user and may share the physiological parameters with a central server.

In some embodiments, at least one other article of PPE 232 is communicatively coupled to the at least one article of PPE 210. In some examples, the at least one other article of PPE 232 may also be communicatively coupled to the first computing device 220. In some embodiments, the first processor 222 is further configured to generate the subscription message SM further based on the at least one functionality F already configured on the at least one other article of PPE 232. For example, the article of PPE 210 may determine that the functionality F is being used by other users in the vicinity of the article of PPE 210. The first processor 222 may suggest or automatically enable the same functionality F on the at article of PPE 210 by generating the subscription message SM.

Various features, devices and sensors shown in FIG. 6 may also be enabled in the system 100 of FIGS. 1 and 2. For example, the location device 226, the at least one sensor 228, and the at least one physiological sensor 230 may be enabled in the system 100 including the at least one article of PPE 110. Further, the least one other article of PPE 232 may be in the vicinity of the at least one article of PPE 110.

Figure 7:
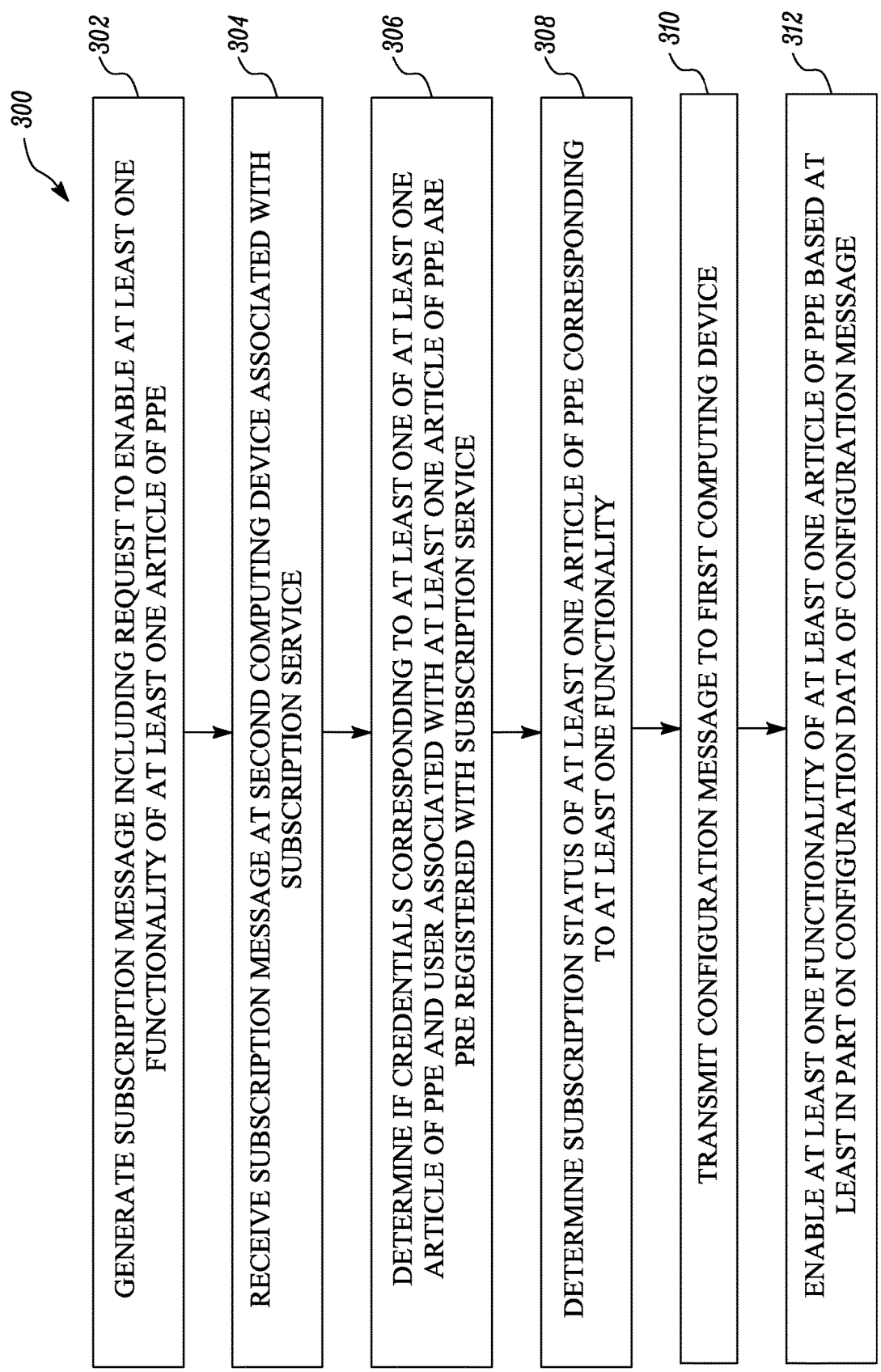
FIG. 7 is a flow chart illustrating a method, in accordance with an embodiment of the present disclosure.

FIG. 7 is a flow chart illustrating a method 300. The method 300 may be implemented using any one of the systems 100, 200 of FIGS. 1-3 and 6. At step 302, the method 300 includes generating, via the first computing device 120, 220, the subscription message SM including a request to enable the at least one functionality F of the at least one article of PPE 110, 210 in response to determining a selection of the at least one functionality F that is selectively configurable using the subscription service 150, 250.

At step 304, the method 300 further includes receiving the subscription message SM at the second computing device 152, 252 associated with the subscription service 150, 250 and communicatively coupled to the first computing device 120, 220. In some embodiments, the method 300 further includes preregistering the at least one article of PPE 110, 210 with the second computing device 152, 252 for enabling the at least one functionality F of the at least one article of PPE 110, 210.

At step 306, the method 300 further includes determining, via the second computing device 152, 252, if credentials corresponding to at least one of the at least one article of PPE 110, 210 and the user 102 associated with the at least one article of PPE 110, 210 are preregistered with the subscription service 150, 250 to enable the at least one functionality F of the at least one article of PPE 110, 210. In some embodiments, the method 300 further includes authenticating at the second computing device 152, 252, the at least one article of PPE 110, 210 based at least on the pre-shared key K associated with the at least one article of PPE 110, 210.

At step 308, the method 300 further includes determining, via the subscription server 160, 260, the subscription status PS of the at least one article of PPE 110, 210 corresponding to the at least one functionality F. The subscription server 160, 260 is communicatively coupled to the second computing device 152, 252.

At step 310, the method 300 further includes transmitting, via the second computing device 152, 252, the configuration message CM to the first computing device 120, 220 based on the subscription status PS and in response to determining that the credentials corresponding to the at least one of the at least one article of PPE 110, 210 and the user 102 associated with the at least one article of PPE 110, 210 are preregistered with the subscription service 150, 250 to enable the at least one functionality F of the at least one article of PPE 110, 210.

In some embodiments, the method 300 further includes at least partially encrypting the configuration message CM based on the key K1 before transmitting the configuration message CM to the first computing device 120, 220. In some embodiments, the key K1 is the public key 276 associated with the at least one article of PPE 110, 210. In some embodiments, the method 300 further includes digitally signing the configuration message based on the private key 264 associated with the second computing device 152, 252.

The configuration message CM includes the configuration data CD to enable the at least one functionality F of the at least one article of PPE 110, 210. In some embodiments, the method 300 further includes configuring the at least one functionality F on the at least one article of PPE 110, 210 based at least in part on the configuration data CD of the configuration message CM.

At step 312, the method 300 further includes enabling, by the first computing device 120, 220, the at least one functionality F of the at least one article of PPE 110, 210 based at least in part on the configuration data CD of the configuration message CM. In some embodiments, the method 300 further includes decrypting the configuration message CM at the first computing device 120, 220 based on the private key 278 corresponding to the public key 276 before enabling the at least one functionality F on the at least one article of PPE 110, 210. In some embodiments, the method 300 further includes verifying the digital signature of the configuration message CM at the first computing device 120, 220 based on the public key 266 corresponding to the private key 264 before enabling the at least one functionality F on the at least one article of PPE 110, 210.

In some embodiments, the at least one functionality F includes at least one of a conference calling function, a level-dependent function, a virtual assistant, a noise dosimetry function, a computer vision function, a data collection and analytics function, a wireless network calling function, an emergency function, a safety function, a Frequency Modulation (FM) radio, a Digital Audio Broadcasting (DAB) radio, and a profile for a work equipment.

In some embodiments, the method 300 further includes generating, via the location device 226, the location signal LS based on a location of the at least one article of PPE 110, 210. The method 300 may further include receiving the location signal LS at the first computing device 120, 220. The method 300 may further include generating, via the first computing device 120, 220, the subscription message SM including the request to enable the at least one functionality F of the at least one article of PPE 110, 210 further based on the location signal LS received from the location device 226. In some embodiments, the method 300 further includes restricting the at least one functionality F based on the location signal LS of the at least one article of PPE 110, 210.

In some embodiments, the method 300 further includes generating, via the at least one sensor 228, the signal SS based on detection of at least one environmental condition of the at least one article of PPE 110, 210. In some embodiments, the at least one environmental condition includes at least one of a hazardous condition, a potentially hazardous condition and a behavior of other personnel in the vicinity of the user 102 of the at least one article of PPE 110, 210. The method 300 further includes receiving the signal SS at the first computing device 120, 220. The method 300 further includes generating, via the first computing device 120, 220, the subscription message SM including the request to enable the at least one functionality F of the at least one article of PPE 110, 210 further based on the signal SS received from the at least one sensor 228.

In some embodiments, the method 300 further includes generating, via the at least one physiological sensor 230, the signal HS based on detection of at least one physiological condition of the user 102 of the at least one article of PPE 110, 210. The method 300 further includes receiving the signal HS at the first computing device 120, 220. The method 300 further includes generating, via the first computing device 120, 220, the subscription message SM including the request to enable the at least one functionality F of the at least one article of PPE 110, 210 further based on the signal HS received from the at least one physiological sensor 230.

In some embodiments, the method 300 further includes generating the subscription message SM further based on the at least one functionality F already configured on the at least one other article of PPE 232. The at least one other article of PPE 232 may be communicatively coupled to the at least one article of PPE 110, 210.

In some embodiments, the method 300 further includes periodically checking, via the first computing device 220, the one or more configuration messages CM from the second computing device 152, 252 to enable the at least one functionality F of the at least one article of PPE 110, 210. In some embodiments, the method 300 further includes disabling the at least one functionality F of the at least one article of PPE 110, 210 upon non-reception of the one or more configuration messages CM from the second computing device 152, 252 after a predetermined period of time.

The systems 100, 200 may allow the article of PPE 110, 210 to enable the functionality F through the subscription service 150, 250. Thus, the user 102 of the article of PPE 110, 210 may be able to access multiple other features that are not already available with the article of PPE 110, 210. Further, the user 102 may not need to purchase multiple articles of PPE 110, 210 separately to have access to different functionalities F. This may reduce an operational cost of the user 102 as a number of functionalities F can be enabled on the article of PPE 110, 210 through the subscription service 150 250.

The second processor 254 may further determine if the user 102 of the article of PPE 110, 210 has subscribed to the functionality F through the subscription server 160, 260 by obtaining the subscription status PS corresponding to the functionality F. This may ensure that the user 102 have access to the correct functionality F intended to be subscribed by the user 102.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including, but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below, or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A system comprising:
at least one article of personal protective equipment (PPE) comprising at least one functionality that is selectively configurable using a subscription service;
a first computing device communicatively coupled to the at least one article of PPE and comprising a first processor and a first memory; and
a second computing device associated with the subscription service and communicatively coupled to the first computing device, the second computing device comprising a second processor and a second memory;
wherein the first memory comprises first instructions that, when executed by the first processor, cause the first processor to generate, in response to determining a selection of the at least one functionality that is configurable using the subscription service, a subscription message comprising a request to enable the at least one functionality of the at least one article of PPE;
wherein the second computing device is configured to receive the subscription message, and the second memory comprises second instructions that, when executed by the second processor, in response to receiving the subscription message, cause the second processor to:
determine if credentials corresponding to at least one of the at least one article of PPE and a user associated with the at least one article of PPE are preregistered with the subscription service to enable the at least one functionality of the at least one article of PPE;
determine a subscription status of the at least one article of PPE corresponding to the at least one functionality from a subscription server communicatively coupled to the second computing device; and
transmit, to the first computing device, a configuration message based on the subscription status and in response to determining that the credentials corresponding to the at least one of the at least one article of PPE and the user associated with the at least one article of PPE are preregistered with the subscription service to enable the at least one functionality of the at least one article of PPE, wherein the configuration message comprises configuration data to enable the at least one functionality of the at least one article of PPE;
wherein the first memory comprises the first instructions that, when executed by the first processor, cause the first processor to, in response to receiving the configuration message, enable the at least one functionality of the at least one article of PPE based at least in part on the configuration data of the configuration message.

2. The system of claim 1, wherein the at least one functionality comprises at least one of a conference calling function, a level-dependent function, a virtual assistant, a noise dosimetry function, a computer vision function, a data collection and analytics function, a wireless network calling function, an emergency function, a safety function, a Frequency Modulation (FM) radio, a Digital Audio Broadcasting (DAB) radio, and a profile for a work equipment.

3. The system of claim 1, further comprising a location device communicatively coupled to the first processor and configured to generate a location signal based on a location of the at least one article of PPE, wherein the first processor is further configured to:
receive the location signal from the location device; and
generate the subscription message comprising the request to enable the at least one functionality of the at least one article of PPE further based on the location signal received from the location device.

4. The system of claim 3, wherein the first processor is further configured to at least partially restrict the at least one functionality based on the location signal of the at least one article of PPE.

5. The system of claim 1, further comprising at least one sensor communicatively coupled to the first processor, the at least one sensor configured to generate a signal based on detection of at least one environmental condition of the at least one article of PPE, wherein the first processor is further configured to:
receive the signal from the at least one sensor; and
generate the subscription message comprising the request to enable the at least one functionality of the at least one article of PPE further based on the signal received from the at least one sensor.

6. The system of claim 5, wherein the at least one environmental condition comprises at least one of a hazardous condition, a potentially hazardous condition and a behavior of other personnel in the vicinity of the user of the at least one article of PPE.

7. The system of claim 1, further comprising at least one physiological sensor communicatively coupled to the first processor, the at least one physiological sensor configured to generate a signal based on detection of at least one physiological condition of the user of the at least one article of PPE, wherein the first processor is further configured to:
receive the signal from the at least one physiological sensor; and
generate the subscription message comprising the request to enable the at least one functionality of the at least one article of PPE further based on the signal received from the at least one physiological sensor.

8. The system of claim 1, further comprising at least one other article of PPE communicatively coupled to the at least one article of PPE, wherein the first processor is further configured to generate the subscription message further based on the at least one functionality already configured on the at least one other article of PPE.

9. The system of claim 1, wherein the second processor is further configured to at least partially encrypt the configuration message based on a key before transmitting the configuration message to the first computing device.

10. The system of claim 1, wherein the second processor is further configured to digitally sign the configuration message based on a private key associated with the second computing device.

11. The system of claim 10, wherein the first processor is further configured to verify the digital signature of the configuration message based on a public key corresponding to the private key before enabling the at least one functionality on the at least one article of PPE.

12. The system of claim 1, wherein the second processor is further configured to authenticate the at least one article of PPE based at least on a pre-shared key associated with the at least one article of PPE.

13. The system of claim 1, further comprising a feature server communicatively coupled to the second computing device, wherein the second processor is further configured to transmit the configuration message to the first computing device through the feature server.

14. A method comprising:
generating, via a first computing device, a subscription message comprising a request to enable at least one functionality of at least one article of PPE in response to determining a selection of the at least one functionality that is selectively configurable using a subscription service;
receiving the subscription message at a second computing device associated with the subscription service and communicatively coupled to the first computing device;
determining, via the second computing device, if credentials corresponding to at least one of the at least one article of PPE and a user associated with the at least one article of PPE are preregistered with the subscription service to enable the at least one functionality of the at least one article of PPE;
determining, via a subscription server, a subscription status of the at least one article of PPE corresponding to the at least one functionality, the subscription server communicatively coupled to the second computing device;
transmitting, via the second computing device, a configuration message to the first computing device based on the subscription status and in response to determining that the credentials corresponding to the at least one of the at least one article of PPE and the user associated with the at least one article of PPE are preregistered with the subscription service to enable the at least one functionality of the at least one article of PPE, wherein the configuration message comprises configuration data to enable the at least one functionality of the at least one article of PPE; and
enabling, by the first computing device, the at least one functionality of the at least one article of PPE based at least in part on the configuration data of the configuration message.

15. The method of claim 14, further comprising:
generating, via a location device, a location signal based on a location of the at least one article of PPE;
receiving the location signal at the first computing device; and
generating, via the first computing device, the subscription message comprising the request to enable the at least one functionality of the at least one article of PPE further based on the location signal received from the location device.

16. The method of claim 14, further comprising preregistering the at least one article of PPE with the second computing device for enabling the at least one functionality of the at least one article of PPE.

17. The method of claim 14, further comprising:
generating, via at least one sensor, a signal based on detection of at least one environmental condition of the at least one article of PPE;
receiving the signal at the first computing device; and
generating, via the first computing device, the subscription message comprising the request to enable the at least one functionality of the at least one article of PPE further based on the signal received from the at least one sensor, and wherein the at least one environmental condition comprises at least one of a hazardous condition, a potentially hazardous condition and a behavior of other personnel in the vicinity of the user of the at least one article of PPE.

18. The method of claim 14, further comprising:
generating, via at least one physiological sensor, a signal based on detection of at least one physiological condition of the user of the at least one article of PPE;
receiving the signal at the first computing device; and
generating, via the first computing device, the subscription message comprising the request to enable the at least one functionality of the at least one article of PPE further based on the signal received from the at least one physiological sensor.

19. The method of claim 14, further comprising generating the subscription message further based on the at least one functionality already configured on at least one other article of PPE, wherein the at least one other article of PPE is communicatively coupled to the at least one article of PPE.

20. A system comprising:
at least one article of personal protective equipment (PPE) comprising at least one functionality that is selectively configurable using a subscription service;
a first computing device communicatively coupled to the at least one article of PPE and comprising a first processor and a first memory;
a second computing device associated with the subscription service and communicatively coupled to the first computing device, the second computing device comprising a second processor and a second memory; and a location device communicatively coupled to the first processor and configured to generate a location signal based on a location of the at least one article of PPE;

wherein the first memory comprises first instructions that, when executed by the first processor, cause the first processor to generate, in response to determining a selection of the at least one functionality that is configurable using the subscription service, a subscription message comprising a request to enable the at least one functionality of the at least one article of PPE;

wherein the second computing device is configured to receive the subscription message, and the second memory comprises second instructions that, when executed by the second processor, in response to receiving the subscription message, cause the second processor to:

determine if credentials corresponding to at least one of the at least one article of PPE and a user associated with the at least one article of PPE are preregistered with the subscription service to enable the at least one functionality of the at least one article of PPE;

determine a subscription status of the at least one article of PPE corresponding to the at least one functionality from a subscription server communicatively coupled to the second computing device; and transmit, to the first computing device, a configuration message based on the subscription status and in response to determining that the credentials corresponding to the at least one of the at least one article of PPE and the user associated with the at least one article of PPE are preregistered with the subscription service to enable the at least one functionality of the at least one article of PPE, wherein the configuration message comprises configuration data to enable the at least one functionality of the at least one article of PPE;

wherein the first memory comprises the first instructions that, when executed by the first processor, cause the first processor to, in response to receiving the configuration message, enable the at least one functionality of the at least one article of PPE based at least in part on the configuration data of the configuration message; and wherein the first processor is further configured to receive the location signal from the location device and at least partially restrict the at least one functionality based on the location signal of the at least one article of PPE.

* * * * *